United States Patent [19]

Hasegawa et al.

[11] Patent Number: 5,453,892
[45] Date of Patent: Sep. 26, 1995

[54] ROTARY MAGNETIC HEAD DRUM WITH FLUID BEARING AND WITH HEAD CHIPS MOUNTED TOGETHER IN PARALLEL

[75] Inventors: Shinichi Hasegawa, Chiba; Yoichirou Senshu; Kenichi Fukahori, both of Kanagawa; Akihiro Uetake, Tokyo, all of Japan

[73] Assignee: Sony Corporation, Tokyo, Japan

[21] Appl. No.: 704,118

[22] Filed: May 22, 1991

[30] Foreign Application Priority Data

Jun. 11, 1990 [JP] Japan .................................. 2-152463

[51] Int. Cl.⁶ .......................... G11B 5/52; G11B 15/61; G11B 21/04
[52] U.S. Cl. ................................ 360/107; 360/84
[58] Field of Search .............. 360/110, 130.24, 360/130.22, 108, 107, 84, 95, 102, 137, 85, 104–106, 109

[56] References Cited

U.S. PATENT DOCUMENTS

| | | | |
|---|---|---|---|
| 4,316,225 | 2/1982 | Maruyama et al. | 360/84 |
| 4,366,519 | 12/1982 | Maruyama et al. | 360/130.24 |
| 4,533,891 | 8/1985 | Vanderlaar et al. | 335/272 |
| 4,573,807 | 3/1986 | Asada et al. | 360/84 |
| 4,603,360 | 7/1986 | Fujiki et al. | 360/84 |
| 4,706,143 | 11/1987 | Asada et al. | 360/108 |
| 4,706,144 | 11/1987 | Asada et al. | 360/130.24 |
| 4,849,839 | 7/1989 | Tsubota et al. | 360/84 |
| 4,897,745 | 1/1990 | Binder-Kriegelstein | 360/109 |
| 4,908,816 | 3/1990 | Champagne et al. | 360/106 |
| 4,922,359 | 5/1990 | Nakamura | 360/107 |
| 5,019,926 | 5/1991 | Van Thuijl et al. | 360/108 |
| 5,034,840 | 7/1991 | Kera et al. | 360/122 |
| 5,065,267 | 11/1991 | Yohda | 360/104 |
| 5,079,658 | 1/1992 | Sakai et al. | 360/84 |
| 5,095,394 | 3/1992 | Yanagihara | 360/77.14 |
| 5,130,875 | 7/1992 | Ono et al. | 360/107 |

FOREIGN PATENT DOCUMENTS 0180852  5/1986  European Pat. Off. .
3707535  9/1987  Germany .

*Primary Examiner*—Stuart S. Levy
*Assistant Examiner*—Jefferson Evans
*Attorney, Agent, or Firm*—William S. Frommer; Alvin Sinderbrand

[57] ABSTRACT

In a digital magnetic recording and/or reproducing apparatus, a magnetic head comprises a plurality of head chips mounted closely together in parallel with each other on a rotary drum member which is rotatably supported by dynamic pressure bearing in which a sleeve and a shaft inserted therein are relatively rotatably supported by fluid under pressure therebetween.

9 Claims, 3 Drawing Sheets

ROTARY MAGNETIC HEAD DRUM WITH FLUID BEARING AND WITH HEAD CHIPS MOUNTED TOGETHER IN PARALLEL

BACKGROUND OF THE INVENTION

1. Field of the Invention

The present invention generally relates to a digital magnetic recording and/or reproducing apparatus for use with, for example, a digital video tape recorder (digital VTR) and, more particularly, is directed to a rotary magnetic head drum for a recording and/or reproducing apparatus.

2. Description of the Prior Art

Recently, so-called digital video tape recorders (digital VTRs) have been developed to record and/or reproduce, for example, a video signal on and/or from a magnetic tape in the form of a digital video signal by utilizing rotary heads. Such conventional digital VTR will be described with reference to FIG. 1.

As shown in FIG. 1, in the conventional digital VTR, two heads 21a and 21b are mounted on a rotary drum 22 at an angle of 180 degrees from each other, and a magnetic tape 23 is wrapped around the rotary drum 22 with a wrapping angle of 180 degrees and is transported at a predetermined tape speed so that, as shown in FIG. 2, recording tracks 24a and 24b are formed on the magnetic tape 23 by the heads 21a and 21b.

In most conventional VTRs, a so-called ball bearing is employed as a bearing of the rotary drum 22. But in digital VTRs, the diameter of rotary drum 22 is reduced, the rotary drum 22 is rotated at high speed and the track pitch is reduced, all of which requires a bearing which can be rotated silently and with high accuracy. A conventional ball bearing, however, cannot meet the above requirements because the balls thereof produce noise and cannot be satisfactorily reduced in size.

The above shortcoming and disadvantages can be overcome by the use of a dynamic pressure bearing as the bearing of the digital VTR. In a dynamic pressure bearing, a shaft rotatably supports a sleeve or bushing with a layer of a fluid (lubricant) therebetween. Thus, the size of the bearing can be determined with relatively large freedom in accordance with the diameter of the rotary drum. Further, since the shaft and sleeve rotate relative to each other without metal-to-metal contact, it is possible to attain high speed rotation without noise. Moreover, the characteristics of the dynamic pressure bearing can be varied by changing the lubricant and thus, the dynamic pressure bearing has various advantages.

However, when the above dynamic pressure bearing is used as the bearing of a rotary drum assembly which, for example, is composed of an upper rotating drum and a lower stationary drum in a digital VTR, in the stop mode (stationary state), the dynamic-pressure bearing permits the upper rotating drum to incline relative to the shaft. If a dynamic pressure bearing having the above-mentioned feature is applied to the shaft of the rotary drum 22 with the diametrically opposed magnetic heads 21a and 21b shown in FIG. 1 or to a head system in which pairs of heads are opposed to each other by 180 degrees, the pairing adjustment made in the stationary state is displaced relative to the head positions during operation by an amount corresponding to the inclined amount of the upper drum relative to its position in the operation mode. Although the inclined amount is determined on the basis of bearing gap, bearing length and drum diameter, the amount of displacement in the height direction falls in a range of from several micrometers to several tens of micrometers, thus considerably degrading the accuracy of the bearing. Accordingly, the track pitch cannot be reduced and the recording density cannot be increased, which are indispensable conditions for a digital VTR.

OBJECTS AND SUMMARY OF THE INVENTION

Accordingly, it is an object of the present invention to provide an improved rotary magnetic head drum assembly for a recording and/or reproducing apparatus in which the aforenoted shortcomings and disadvantages of the prior art can be eliminated.

More specifically, it is an object of the present invention to provide a rotary magnetic head drum assembly for a recording and/or reproducing apparatus in which the track pitch can be substantially reduced during magnetic recording.

It is another object of the present invention to provide a rotary magnetic head drum assembly for a recording and/or reproducing apparatus in which recording density can be increased with ease.

In accordance with an aspect of the present invention, a rotary magnetic head drum assembly for a recording and/or reproducing apparatus is comprised of: a magnetic head in which a plurality of head chips are mounted close to each other in parallel on a rotary drum member; and a dynamic pressure bearing for the rotary drum member which includes a shaft within a sleeve rotatable relative to each other with a fluid or lubricant therebetween.

The above, and other objects, features and advantages of the present invention will become apparent in the following detailed description of an illustrative embodiment thereof which is to be read in conjunction with the accompanying drawings, in which like reference numerals are used to identify the same or similar parts in the several views.

DETAILED DESCRIPTION OF THE PREFERRED EMBODIMENT

An embodiment of a rotary head drum assembly for a recording and/or reproducing apparatus according to the present invention will hereinafter be described with reference to FIGS. 3 to 5.

Figure 1:
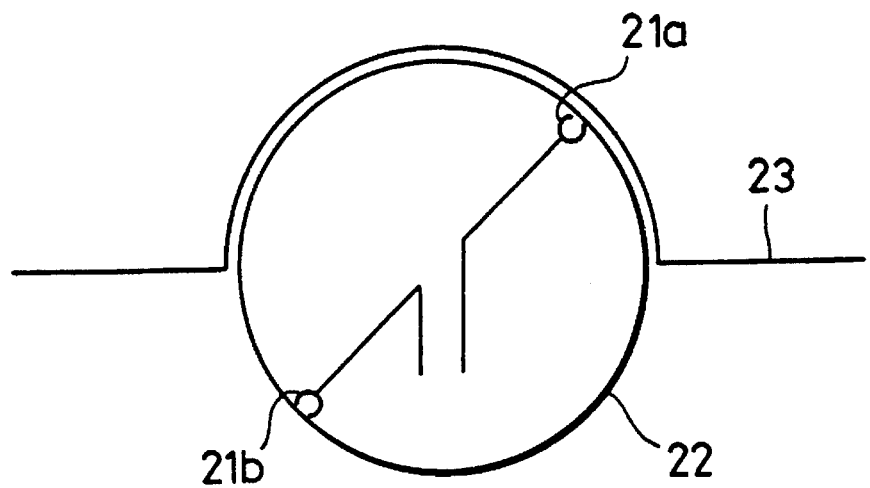
FIG. 1 is a schematic diagram showing an example of a head arrangement of a digital video tape recorder according to the prior art.
Figure 2:
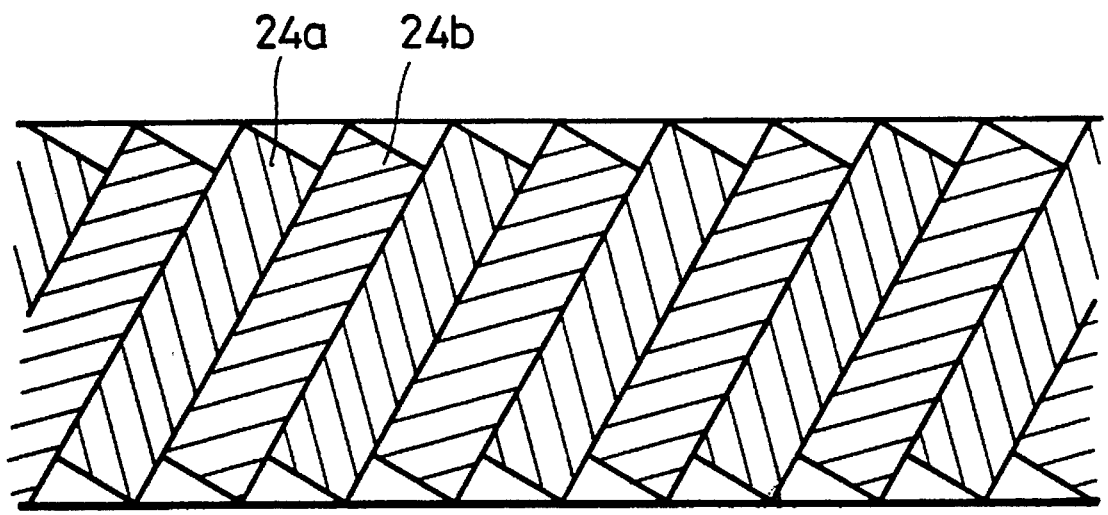
FIG. 2 is a schematic view showing an example of recording tracks formed on a magnetic tape according to the prior art.
Figure 3:
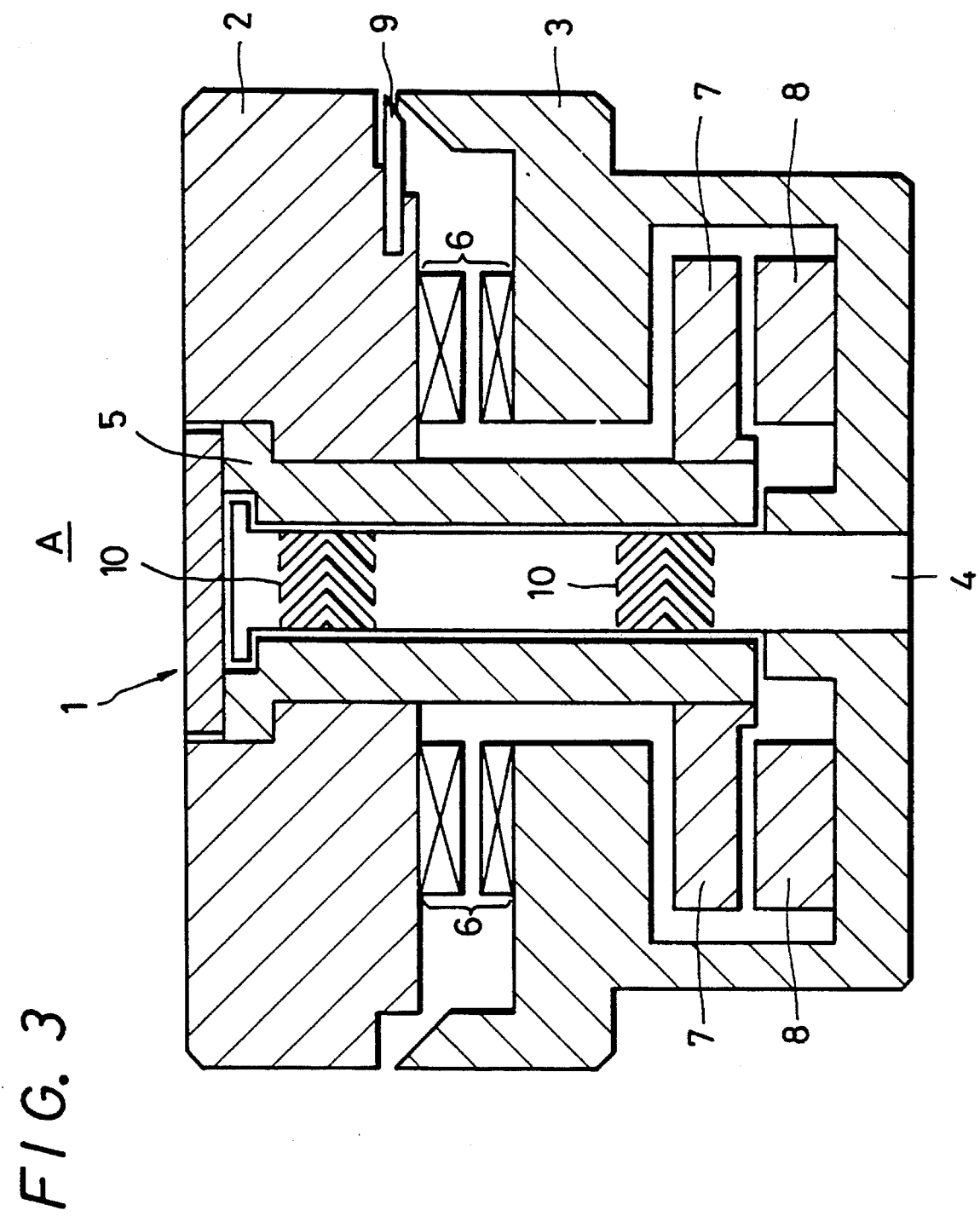
FIG. 3 is a cross-sectional view schematically showing a main portion of an arrangement of a rotary drum assembly of a magnetic recording and/or reproducing apparatus according to an embodiment of the present invention.

FIG. 3 is a schematic cross-sectional view of a rotary drum assembly A for a digital VTR according to an embodiment of the present invention, and particularly shows a bearing 1 as a main portion thereof.

As shown in FIG. 3, the rotary drum assembly A is composed of an upper drum 2 and a lower drum 3. A sleeve 5 is suitably secured to the inner surface of the upper drum 2 and is rotatably supported by a shaft 4 which is extended upward from the lower drum 3 with a fluid or lubricant layer between shaft 4 and sleeve 5. In this embodiment, the lower drum 3 is made stationary together with the shaft 4, while the sleeve 5 is rotated as a unit with the upper drum 2 about the shaft 4. Further, the upper and lower drums 2 and 3 are made of, for example, aluminum alloy, whereas the sleeve 5 is made of a material softer than the aluminum alloy, for example, copper alloy in order to prevent the shaft 4 from being worn when the sleeve 5 comes into metal-to-metal contact with the shaft 4 when the upper drum 2 stops rotating.

In FIG. 3, a rotary transformer 6, a rotor 7 and a stator 8 constitute a rotary driving system the upper drum 2. Further, as shown in FIG. 3, a magnetic head 9, which will be described later, is mounted on the rotary upper drum 2.

Figure 4:
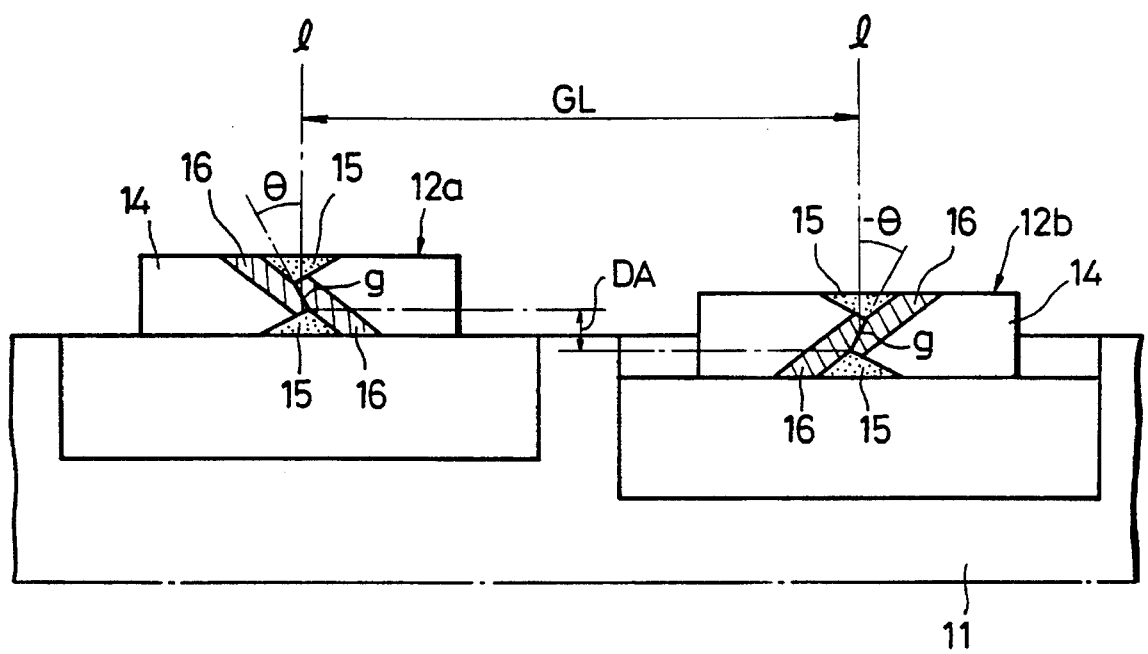
FIG. 4 is an enlarged front view of a main portion of a magnetic head according to the embodiment of the present invention.
Figure 5:
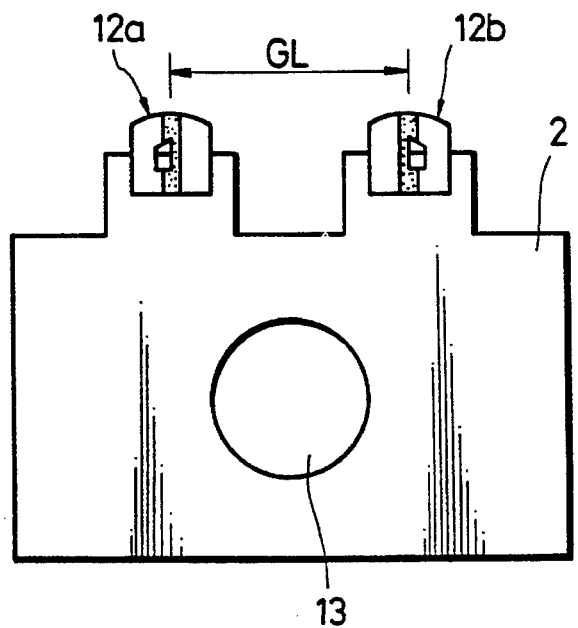
FIG. 5 is a plan view of the head shown in FIG. 4.

As shown in FIGS. 4 and 5, the magnetic head 9 of this embodiment is formed of two head chips 12a and 12b which are disposed on one head base 11 in close proximity and parallel to each other. In FIG. 5, the head base 11 is shown to have an insertion aperture 13 into which a screw (not shown) for securing the head base 11 to the upper drum 2 of the rotary drum A may be inserted. The head chips 12a and 12b are constructed such that respective ferrite heads 14 are obliquely cutaway or recessed as at 15 at their portions near gaps g, which are then sputtered (sprayed) with Sendust for forming soft magnetic layers 16. The respective gaps g are inclined relative to the vertical lines 1 (shown by one-dot chain lines) by angles $+\Theta$ and $-\Theta$, respectively. Incidentally, the recesses 15 are filled with glass. Also, a predetermined spacing GL is provided between the respective gaps g in the head scanning direction so as to avoid influences therebetween, such as, crosstalk or the like. Then, the thus arranged magnetic head 9 is mounted on the head mounting surface of the upper drum 2 of the rotary drum A by using the previously mentioned screw (not shown), and the positions of the head chips 12a and 12b in the track pitch direction are aligned by using pairing adjustment screws (not shown). In that case, since the two head chips 12a and 12b are mounted close to each other, the pairing adjustment can be made with relatively high accuracy even in the condition when the upper drum 2 or shaft 4 is inclined.

When the upper drum 2 is driven by the above-described rotary driving system, the upper drum 2 is rotated about the shaft 4 while being substantially noiselessly supported by fluid under pressure within the bearing 1. The pressure of such fluid between the sleeve 5 and the shaft 4 is generated in accordance with the rotation of the upper drum 2 during recording and/or reproduction of signals on a magnetic tape (not shown) helically transported along the circumferential surface of the rotary drum A by the head 9 secured on the upper drum 2. As shown on FIG. 3, grooves 10 of V-shaped configuration are formed on the outer surface of shaft 4 and, in response to turning of the sleeve 5 with upper drum 2, the grooves 10 exert a pumping action by which lubricating fluid is pressurized between shaft 4 and sleeve 5 to enable the upper drum 2 to stably rotate with respect to the shaft 4. In respect to the foregoing, it will be appreciated that the fluid flows along the grooves 10 so that the vertexes of V-letter shaped grooves 10 become high-pressure portions, or act as so-called wedges from a metal bearing standpoint, so that the upper drum 2 is rotated with high accuracy.

In the embodiment described above, since the dynamic pressure bearing 1 is used as the bearing for the rotary drum A, the rotary drum A can be reduced in diameter and its upper drum can be rotated at high speed. Also, the upper drum 2 can be rotated with high accuracy and very quietly. In addition, since the magnetic head 9 in which the plurality of head chips 12a and 12b are closely mounted in parallel to each other is employed as the magnetic head, poor pairing adjustment, which is otherwise a disadvantage of the above dynamic pressure bearing 1, can be avoided, and the pairing adjustment can be carried out with high accuracy. In other words, by using the above-mentioned magnetic head 9, a highly accurate rotary mounting, which is the advantage of the dynamic pressure bearing 1, can be effectively utilized and satisfactory track patterns can be formed on the magnetic tape. As a result, the track pitch can be further reduced and the recording density can be increased with ease in the magnetic recording.

Incidentally, when using the above described magnetic head 9, a video signal of, for example, one field is divided into two parts and the divided signals are respectively supplied to the two head chips 12a and 12b, whereby signals of two channels can be simultaneously recorded on the magnetic tape. It is needless to say that signals of two channels can be similarly reproduced simultaneously. In that case, and considering the delay time of the succeeding head chip (e.g., head chip 12b), it is preferable to provide a level difference DA (see FIG. 4) in the track pitch direction between the head chips 12a and 12b.

While the present invention has been described above as applied to the rotary drum composed of the lower stationary drum 3 and the upper rotating drum 2, the present invention is not limited thereto and the present invention can also be similarly applied to a rotary drum composed of a lower rotating drum and an upper stationary drum, or to a rotary drum in which only a head disc is rotated between fixed upper and lower drums.

Having described a preferred embodiment of the invention with reference to the accompanying drawings, it is to be understood that the invention is not limited to that precise embodiment, and that various changes and modifications thereof could be effected by one skilled in the art without departing from the spirit or scope of the novel concepts of the invention as defined in the appended claims.

We claim as our invention:

1. A rotary magnetic head drum assembly comprising:
    fixed support means;
    a shaft extending from said support means;
    a rotary drum member on which only one magnetic head is mounted, a plurality of head chips being mounted closely together in parallel with each other in said magnetic head; and
    a dynamic pressure bearing within said rotary drum member including a sleeve in which said shaft is inserted with a fluid layer therebetween and means for pressurizing said fluid layer so that said rotary drum member is rotatably supported by said fluid layer; said sleeve within said rotary drum member being of a material different from that of said rotary drum member.

2. A rotary magnetic head drum assembly according to claim 1, wherein said rotary drum member is of aluminum alloy and said sleeve is of copper alloy.

3. A rotary magnetic head drum assembly according to claim 1, further comprising driving means for driving said rotary drum member including a rotor attached to said sleeve and a stator.

4. A rotary magnetic head drum for a recording and/or reproducing apparatus according to claim 3, wherein said rotating member is an upper drum.

5. A rotary magnetic head drum assembly according to claim 4, wherein said stator of said driving means is attached to said fixed support means.

6. A rotary magnetic head drum assembly according to claim 5, wherein said shaft is fixed to said fixed support means.

7. A rotary magnetic head drum assembly according to claim 1, wherein said sleeve within said rotary drum member is of a material that is softer than that of said rotary drum member.

8. A rotary magnetic head drum assembly comprising:
fixed support means;
a shaft extending from said support means;
a rotary drum member on which at least one magnetic head is mounted; and
a dynamic pressure bearing within said rotary drum member including a sleeve in which said shaft is inserted with a fluid layer therebetween and means for pressurizing said layer so that said rotary drum member is supported by said fluid layer when said rotary drum member is rotating and said sleeve is in contact with said shaft when said rotary drum member is stationary; said sleeve being of a material that is softer than that of said rotary drum member for preventing said shaft from being worn by contact with said sleeve at times when said drum member stops rotating.

9. A rotary magnetic head drum assembly according to claim 8, wherein said rotary drum member is of aluminum alloy and said sleeve is of copper alloy.

* * * * *